(No Model.)
J. A. MATHIEU.
APPARATUS FOR SEPARATING SUBSTANCES WHICH VOLATILIZE AT DIFFERENT TEMPERATURES.
No. 374,077. Patented Nov. 29, 1887.
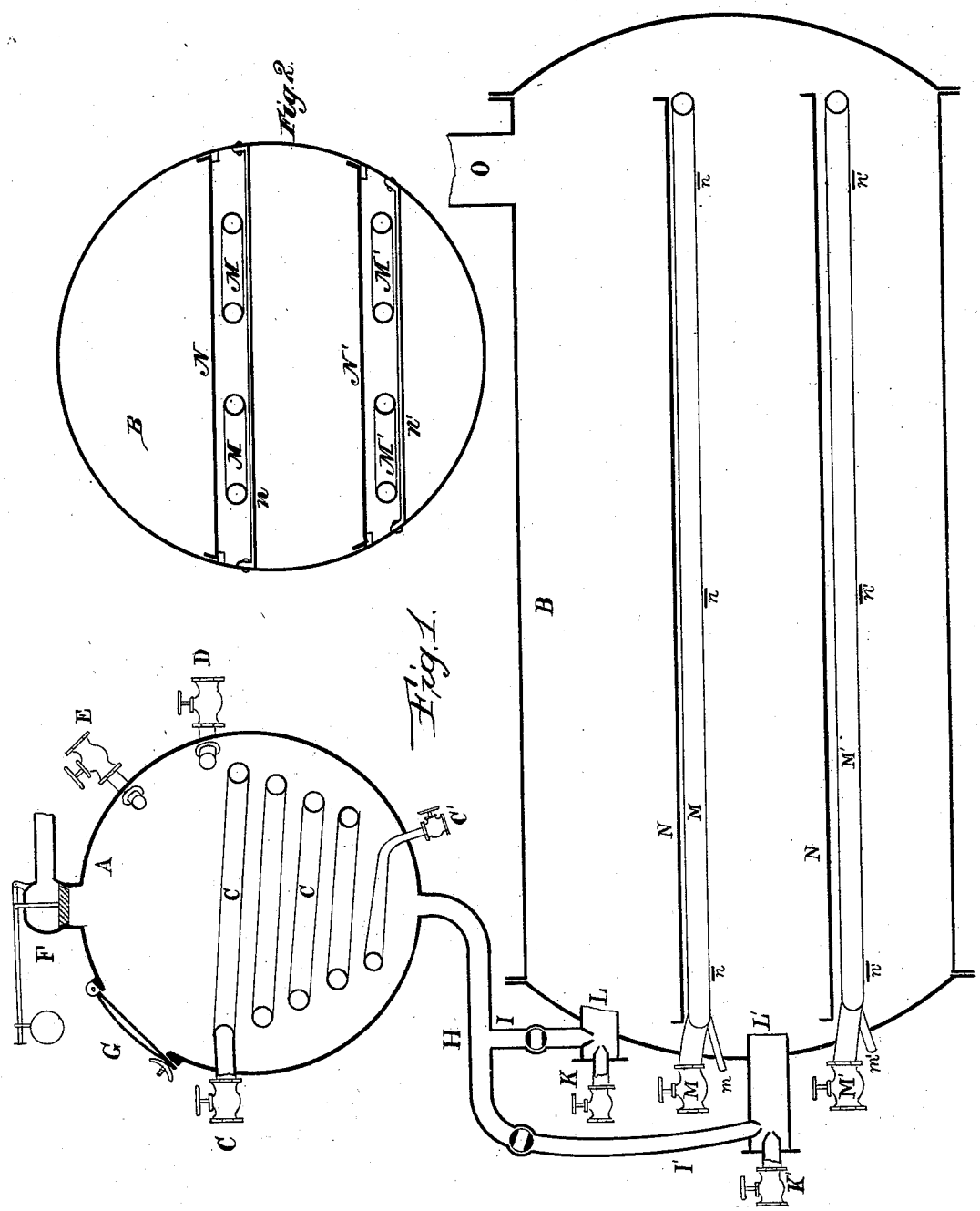
Witnesses
Inventor
Jean A. Mathieu.
By James L. Norris,
Atty.

UNITED STATES PATENT OFFICE.

JEAN A. MATHIEU, OF DETROIT, MICHIGAN.

APPARATUS FOR SEPARATING SUBSTANCES WHICH VOLATILIZE AT DIFFERENT TEMPERATURES.

SPECIFICATION forming part of Letters Patent No. 374,077, dated November 29, 1887.

Application filed January 2, 1883. Serial No. 80,775. (No model.)

*To all whom it may concern:*

Be it known that I, JEAN A. MATHIEU, of Detroit, in the county of Wayne and State of Michigan, have invented a new and useful Improvement in Apparatus for Separating Substances which Volatilize at Different Temperatures, of which the following is a specification.

My invention consists in an apparatus for separating a mixture of substances which volatilize at different degrees of temperature.

Figure 1 is a vertical longitudinal section; and Fig. 2 is a vertical section on line $x\,x$, Fig. 1.

A represents a closed metallic vessel of any suitable or convenient form, having therein a man-hole closed by a door, G.

F represents a safety-valve on vessel A.

E represents a pipe, having therein a valve by which live steam can be admitted at will to vessel A.

C represents a steam-coil arranged within vessel A, having an inlet-pipe and an outlet-pipe, (marked C',) and such valves for controlling the admission of steam thereto as are usual in steam-heating radiators. Coil C serves to heat the contents of vessel A.

H represents a pipe leading from the bottom of vessel A, ending in one, two, or more nozzles, I I', having contracted ends opening into larger pipes or trunks, L L', which open into a metallic vacuum-pan, B.

K K represent steam-pipes, with ordinary valves therein, which open into pipes L L' at right angles with pipes I I', thus forming practically an atomizer.

B represents a metallic vacuum-pan, having therein one or more sets of steam-heating coils, M M', supported on braces $n$, fastened to the walls of the pan.

On each set of steam heating-coils M M' rests a movable shelf or pan, N N', and one end of pan B is made removable, or else provided with a large door, to allow easy removal and replacement of pans N N'. Each pan N N' is so placed with reference to one of the pipes L L' that any matters blown through said pipes will fall on one of said pans.

O represents a pipe leading from vacuum-pan B to one or more condensers, (which may be similar to the condensers shown in Letters Patent No. 234,998, granted to me the 30th of November, 1880,) which are in turn connected with an air-pump, by means of which a vacuum can be partially or entirely maintained in vacuum-pan B, pipe O, and the condensers.

As I claim in this application no particular form of condenser or vacuum pump, I have not deemed it necessary to show them in the drawings.

Pipes I I' each have an ordinary valve therein to regulate flow of matter through them.

The steam which passes through pipes K K' may be made from water or from the liquid which is being operated upon.

The operation of my invention is as follows: A mixture containing two or more elements which volatilize at different degrees of heat is forced into vessel A through pipe D. Steam is now passed through the coil C until the mixture is heated to or a little beyond the point at which turpentine volatilizes. If the turpentine and methyl alcohol form a large part of the mixture, it is obvious that a few more degrees of heat will be necessary than in cases where the proportion of resin is larger. By opening the valve in pipe I and the valve in pipe K a portion of the mixture in vessel A descends through pipes H I, is met by a jet of steam from pipe K, and is blown in fine hot spray into vacuum-pan B. Steam is admitted through coils M M' to heat the vacuum-pan, and the vacuum-pump at the same time exhausts the air from pan B. Pipes $m\,m'$ are connected with the heating-coils M M' for carrying off any condensed matter present therein. The substances which volatilize at a point below the temperature of the mixture—viz., the turpentine and methyl alcohol—will instantly flash into steam and be drawn off through pipe O, while the resin will be deposited on pan N. When the steam enters a condenser on pipe, O, between the vacuum-pump and vacuum-pan B, the turpentine therein contained will be deposited in said condenser if the temperature of said condenser be maintained by any suitable means at a point below that at which turpentine volatilizes, while the methyl alcohol will pass through said condenser, the temperature therein being above the point at which methyl alcohol volatilizes, and is delivered into and condensed in any cool receptacle.

Live steam can at any time be admitted to vessel A, above the mixture therein contained, through pipe E, to either heat said mixture or force it through pipes H I I'.

Having thus described my invention, what I claim as new, and desire to secure by Letters Patent, is—

The combination of the vacuum-pan B, having the interior heating-coils, M M', and the trays N N', with the atomizer devices I I', L L', and K K', for spraying liquid material into the vacuum-pan above the trays N N', substantially as herein set forth.

JEAN A. MATHIEU.

Witnesses:
MALCOLM W. EDGAR,
GEO. H. LOTHROP.